(12) United States Patent
Zimmer et al.

(10) Patent No.: US 8,151,027 B2
(45) Date of Patent: Apr. 3, 2012

(54) SYSTEM MANAGEMENT MODE INTER-PROCESSOR INTERRUPT REDIRECTION

(75) Inventors: Vincent J. Zimmer, Federal Way, WA (US); Jiewen Yao, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/384,725

(22) Filed: Apr. 8, 2009

(65) Prior Publication Data

US 2010/0262743 A1 Oct. 14, 2010

(51) Int. Cl.
*G06F 13/24* (2006.01)
(52) U.S. Cl. .................................... 710/261
(58) Field of Classification Search ........... 710/260–269
See application file for complete search history.

(56) References Cited

U.S. PATENT DOCUMENTS

| | | | | |
|---|---|---|---|---|
| 5,764,999 A * | 6/1998 | Wilcox et al. | ................. | 710/261 |
| 6,779,065 B2 * | 8/2004 | Murty et al. | ................. | 710/260 |
| 6,848,046 B2 * | 1/2005 | Zimmer | ...................... | 713/100 |
| 7,200,701 B2 * | 4/2007 | Stultz | ............................ | 710/267 |
| 7,363,411 B2 * | 4/2008 | Kobayashi et al. | ........... | 710/261 |
| 7,383,587 B2 * | 6/2008 | Watt et al. | ....................... | 726/30 |
| 7,433,985 B2 * | 10/2008 | Ayyar et al. | ................... | 710/260 |
| 7,797,473 B2 * | 9/2010 | Rangarajan et al. | ......... | 710/260 |
| 2005/0102447 A1 * | 5/2005 | Stultz | ............................... | 710/33 |
| 2005/0102457 A1 * | 5/2005 | Stultz | ........................... | 710/260 |
| 2007/0239917 A1 * | 10/2007 | Orita et al. | .................... | 710/268 |
| 2008/0071957 A1 * | 3/2008 | Shah | ............................ | 710/260 |

* cited by examiner

*Primary Examiner* — Paul R Myers
(74) *Attorney, Agent, or Firm* — Trop, Pruner & Hu, P.C.

(57) ABSTRACT

A method, processor, and system are disclosed. In one embodiment method includes a first processor core among several processor cores entering into a system management mode. At least one of the other additional processor cores apart from the first processor core remain operational and do not enter the system management mode. Then, once in the system management mode, the first processor core responds to an inter-processor interrupt.

12 Claims, 3 Drawing Sheets

SYSTEM MANAGEMENT MODE INTER-PROCESSOR INTERRUPT REDIRECTION

FIELD OF THE INVENTION

The invention relates to processing inter-processor interrupts while in system management mode.

BACKGROUND OF THE INVENTION

SMM (System Management Mode) is an essential part in central processing units, such as 32 or 64-bit Intel (microprocessor. Many important computer platform activities are generally performed in SMM code provided by original equipment manufacturer (OEM) firmware on a computer platform, such as enabling and disabling an Advanced Configuration and Power Interface (ACPI), utilizing a digital thermal sensor, the hot-plugging of memory, etc. A core will enter SMM if it receives a SMI (System Management Interrupt).

The central processors residing in current computer platforms frequently have several cores (i.e. 2, 4, 8, 16, etc. cores per processor). Although the performance of a many-core central processor can generally outperform their single-core counterparts, there are several technical challenges to efficiently operating in a many-core environment. Currently, platform firmware synchronizes all CPU cores for SMM in order to meet Operating System (OS) software models because the OS kernels cannot tolerate one core disappearing or not responding to actions like an Inter-Processor-Interrupt (IPI).

The PI (Platform Initialization) 1.1 (www.uefi.org) specification defines SMM architecture for Unified Extensible Firmware Interface (UEFI)-based firmware. However, both current UEFI firmware and legacy basic input/output system (BIOS) disable interrupts in the SMM environment.

BRIEF DESCRIPTION OF THE DRAWINGS

The present invention is illustrated by way of example and is not limited by the drawings, in which like references indicate similar elements, and in which.

DETAILED DESCRIPTION OF THE INVENTION

Figure 1:
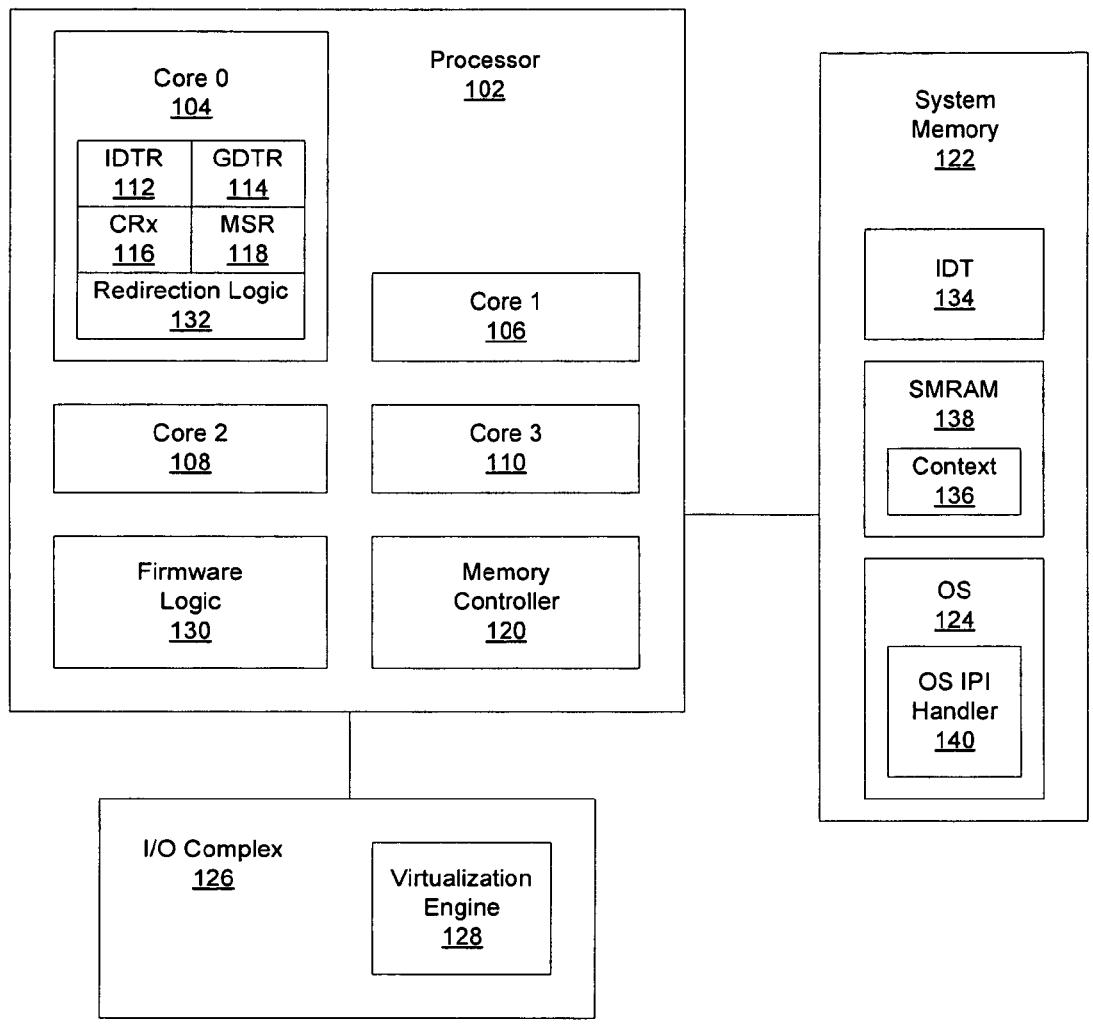
FIG. 1 illustrates an embodiment of a computer platform and processor capable of processing an IPI targeting a responding core in SMM.

Embodiments of a device, system, and method for redirecting Inter-Processor Interrupts while in System Management Mode are described.

A processing core within a central processor in a computer platform may enter SMM (System Management Mode) upon receiving a SMI (System Management Interrupt). The core may enter SMM to complete one or more tasks specific to that mode. In computer platforms with current firmware solutions, a core in SMM does not respond to IPIs (Inter-processor Interrupts). Additionally, in current computer platforms, when one processing core in the platform receives an SMI to enter SMM, firmware on the computer platform will synchronize all cores to enter the SMM. Thus, current entry into and exit out of SMM is a synchronous process that happens to all cores. This may unnecessarily cause a significant amount of processing interruption among the cores. This interruption may particularly be noticeable with certain Quality-of-Service (QoS) activities like streaming audio/video, which may start to show jitter with more cores-in-SMM and/or longer-SMM-occupancy times.

In many embodiments, a modification to the "all-core SMM synchronization" model may be warranted. For example, if the SMI is issued but the required SMM transactions are specific to a single core in a many-core processor, it generally would increase processor efficiency to simply cause the single targeted core to enter SMM and leave the remaining cores to continue to perform standard operations. An IPI issue currently arises when implementing this modified "targeted-core SMM" entry/exit model. Simply, a core that is left alone and not put into SMM may issue an IPI to one or more cores that have been put into SMM. Although, if an IPI is sent from a core not in SMM to a core in SMM, the IPI will not be received because the core in SMM will seem absent and non-responsive.

Thus, in many embodiments, the targeted core control flow breaks out of a standard SMI handler and responds to the IPI while in SMM. Specifically, in response to the IPI, the system context for the targeted core is saved and then control is passed to an operating system (OS) handler for the IPI. Once the OS IPI has completed, the system context is restored and control is passed back to the SMI handler for further work.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

FIG. 1 illustrates an embodiment of a computer platform and processor capable of processing an IPI targeting a responding core in SMM. The computer platform 100 may include a processor, such as processor 102. In other embodiments that are not shown, the computer system 100 may include two or more processors. Processor 102 may be an Intel®-based central processing unit (CPU) or another brand CPU. In different embodiments, processor 102 may have one or more cores. For example, FIG. 1 shows processor 102 with four cores: core 0 (104), core 1 (106), core 2 (108), core 3 (110). In other embodiments that are not shown, processor 102 may have 2, 8, 16, or more cores.

Each processor core may include several internal operational units such as execution units and instruction retirement units. Also, each core may also include several internal memory locations utilized to store data, such as registers and caches. For example, in an Intel®-based microprocessor architecture, each core may include an Interrupt Descriptor Table (IDT) register (IDTR 112), a Global Descriptor Table (GDT) register (GDTR 114), one or more Control Registers (CRx 116), one or more Model Specific Registers (MSR 118), etc.

The IDTR 112 stores an address location of an IDT. The IDT is a data structure used by general x86 computer architectures to implement an interrupt vector table. The IDT is used by the core to determine the correct response to interrupts and exceptions received by the core.

The GDTR 114 stores an address location of a GDT. The GDT is a data structure used to define the characteristics of the various memory areas for program execution purposes. For example the base address, the size, and the access privileges of individual memory segments.

Each CRx 116 (e.g. CR0, CR1, etc.) is a processor register which changes or controls the general behavior of the core, in this case Core 0 (104). Some tasks the control registers may control are interrupt control, memory paging control, and addressing mode control.

Each MSR 118 (i.e. there may be several MSRs that each store different information) provides system software, such as an OS, with features that are provided on specific processor implementations, but not others. The information within MSRs may tell the OS what capabilities the core or the processor in general has.

The storage registers shown in Core 0 (104) are just a sampling of the registers located within that particular core. In practice there may be many more storage registers as well as one or more memory caches also within Core 0 (104), although these additional storage locations are not shown in FIG. 1. In other embodiments, the processor 102 is a non-Intel® processor and other storage locations with similar functionality may instead be present.

Processor 102 is coupled to a memory subsystem through memory controller 120. Although FIG. 1 shows memory controller 120 integrated into processor 102, in other embodiments that are not shown, the memory controller may be integrated into a bridge device or other integrated circuit in the computer system that is discrete from processor 102. The memory subsystem includes system memory 122 to store instructions to be executed by the processor. The memory devices in the memory subsystem may be any type of volatile dynamic random access memory (DRAM), for example double data rate (DDR) synchronous DRAM, and/or any type of non-volatile memory, for example a form of Flash memory. The processor(s) is coupled to the memory by a processor-memory interface, which may be a link (i.e. an interconnect/bus) that includes individual lines that can transmit data, address, control, and other information between the processor(s) and the memory.

A host operating system (OS) 124 is representative of an operating system that would be loaded into the memory of the computer platform 100 while the platform is operational to provide general operational control over the platform and any peripherals attached to the platform. The host OS 124 may be a form of Microsoft® Windows®, UNIX, LINUX, or any other functional OS. The host OS 124 provides an environment in which one or more programs, services, or agents can run within. In many embodiments, one or more software applications may be running on top of the host OS 124. The application may be any type of software application that performs one or more tasks while utilizing system resources.

The computer platform may also include an input/output (I/O) logic complex 126. The I/O logic complex 126 may include one or more integrated controllers for managing portions of an I/O subsystem within the computer platform 100. For example, the I/O complex 126 may include one or more integrated Universal Serial Bus (USB) host controllers (not shown) to control the flow of information between the processor and one or more USB devices that may be plugged into the computer platform 100.

In many embodiments, the I/O complex includes a virtualization engine 128. The virtualization engine 128 may include logic to facilitate the separation of the computer platform 100 into multiple virtual machines (VMs). For example, there may be two VMs currently running on the computer platform 100, each with a separate set of allocated system resources (e.g. system memory). One VM may be implemented as a lower priority VM that provides resources for the host OS 124. A second VM may be implemented as a higher priority VM that provides certain prioritized resources to a system administrator for remote information technology (IT) access to the computer platform 100. More VMs may be implemented in different examples, such as a VM providing resources solely for a Voice-over-Internet-Protocol (VoIP) phone coupled to the computer platform 100.

The virtualization engine 128 may also implement a strong hardware-based security check process for the host OS 124. For example, the low priority host OS-based VM may be securely measured for integrity at the initial boot process or at any time during platform operation by a higher priority security VM. These security measures may allow for assurance to the end user of the computer platform 100 that the host OS 124 and any software application running on top of the host OS has not been compromised.

In many embodiments, the processor 102 includes storage for firmware logic 130. The firmware logic 130 may include pre-boot and post-boot routines to help initialize the processor for the start of the boot process as well as provide runtime services for the host OS 124. In many embodiments, the computer platform 100 employs a Unified Extensible Firmware Interface (UEFI) that exists to facilitate communication between the host OS 124 and the processor/platform firmware. The UEFI in part allows the host OS 124 to co-function with one of a number of processors utilizing a standard interface.

As described above, the processor 102 is a multi-core processor and individual cores can send interrupts to other cores, utilizing IPIs, to request some form of functional work to be performed by the one or more other cores that are the target(s) of the IPIs. Additionally, in many embodiments, the processor 102 has the ability to enter and exit SMM. While in SMM, normal processor execution within each core would generally be suspended. In other words, currently when an SMI arrives at the processor, firmware logic 130 or other logic within processor 102, synchronizes all cores by bringing them into SMM.

Figure 2:
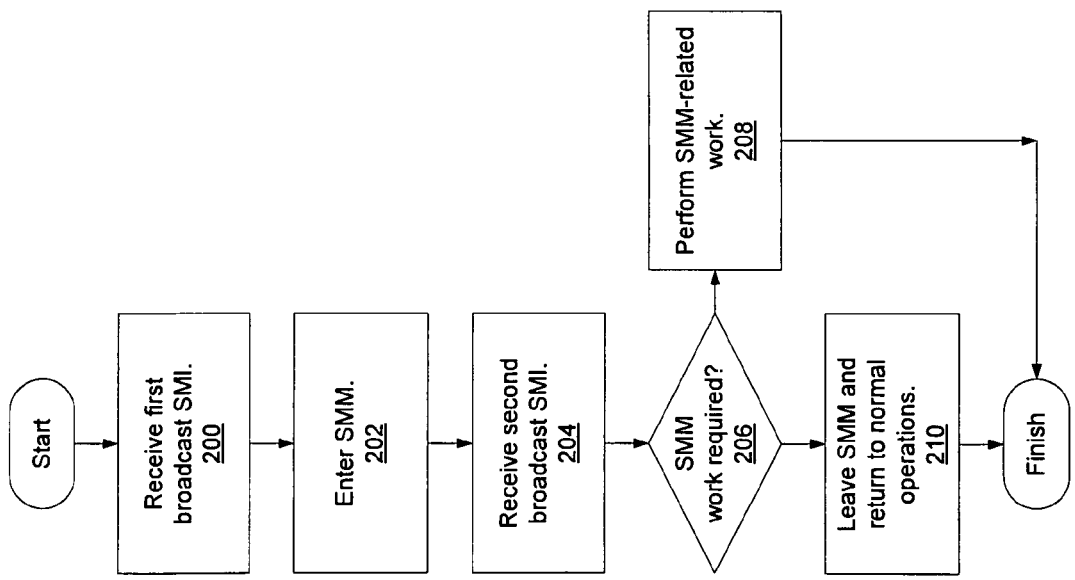
FIG. 2 is a flow diagram of an embodiment of a process to bring a processing core out of SMM if the processing core does not have work to perform while in SMM.

Though, in many embodiments, one or more cores in processor 102 may continue to operate normally without entering SMM while one or more other cores are performing work in SMM. For example, FIG. 2 is a flow diagram of an embodiment of a process to bring a processing core out of SMM if the processing core does not have work to perform while in SMM. The process may be performed by hardware, software, or a combination of both. The process begins by core processing logic receiving a first broadcast SMI (processing block 200). The SMI is broadcast to all processor cores. Upon receiving the SMI, processing logic in the core enters SMM (processing block 202). Next a second broadcast SMI is received, which also is sent to all cores (processing block 204). In many embodiments, the second broadcast SMI alerts each core that if they are not busy in SMM that they can leave SMM and return to any normally scheduled work.

Thus, processing logic within the given core determines whether the core in question has any SMM work to complete or if it is sitting idle (processing block 206). If the core has SMM work to complete, then processing logic allows the core to stay in SMM and perform the SMM-related work (processing block 208). Otherwise, if the core is sitting idle in SMM with no SMM-related work to complete, then processing logic removes the core from SMM and returns the core to normal operation (processing block 210). This process may be performed by processing logic within each core or platform level logic external to each core that is capable of determining the status of each core remotely. Thus, at the conclusion of this process, each core that was sent into SMM to perform work may stay in SMM. On the other hand, each core that was sent into SMM solely based on a SMM core synchronization process and otherwise has no SMM-related work is brought out of SMM to continue normal operations (e.g. executing application code on top of the host OS).

Figure 3:
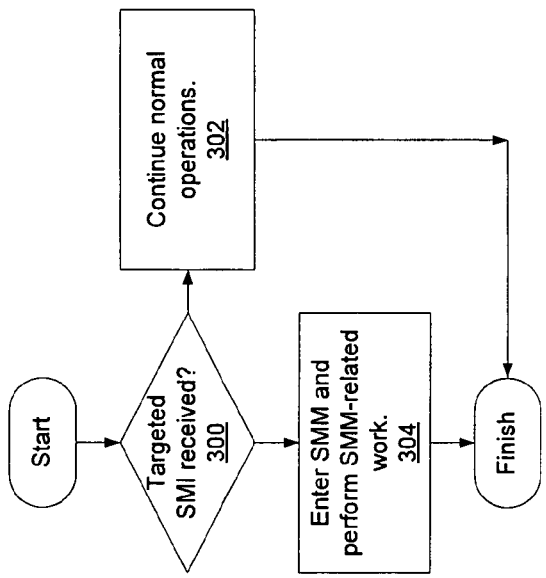
FIG. 3 illustrates another embodiment of a process to bring single cores into SMM.

FIG. 3 illustrates another embodiment of a process to bring single cores into SMM. The drawback of the process in FIG. 2 is that broadcast SMIs are not extremely efficient. A core that would otherwise stay out of SMM would be brought into SMM and then back out. While this is more efficient than requiring a non-working core to sit idly in SMM for the entire duration that one or more other cores are performing work, it is potentially less efficient than employing targeted SMIs. A targeted SMI is directed at a specific core. Thus, if a single core is required to do work in SMM, a targeted SMI can be sent directly to the targeted core while each of the other cores do not receive any SMI. Thus, if targeted SMIs are implemented on the computer platform, processing logic in each core can bring the particular core into SMM if it receives the targeted SMI and otherwise the core is not disturbed and allowed to continue normal operations. Therefore, processing logic in a core determines if a targeted SMI has been received (processing block 300). If the processing logic within the core has not received a targeted SMI, then processing logic allows the core to continue normal operations (processing block 302). Otherwise, if the processing logic determines a targeted SMM has been received, then the logic enters the core into SMM and allows the core to perform SMM-related work (processing block 304).

Thus, upon implementing either the FIG. 2 or FIG. 3 process, the platform may have a processor with some cores in SMM and some not in SMM at any one time. IPIs can cause significant issues on a platform that allows a processor with some cores in SMM and some out of SMM at the same time. As discussed above, if one core that is not in SMM initiates an IPI to another core that is in SMM, the IPI may not reach the destination core unless there is a modification to the IPI handling mechanism in each core. Currently, a core in SMM would not be capable of receiving an IPI as the core would look absent. Thus, a modification to allow a core in SMM to receive IPIs is desirable.

Returning to FIG. 1, in many embodiments, each core includes logic to handle the receipt and redirection of IPIs in SMM mode. For example, Core 0 (104) may include redirection logic 132. Redirection logic 132 may comprise hardware circuitry or firmware code stored in a firmware storage location.

Figure 4:
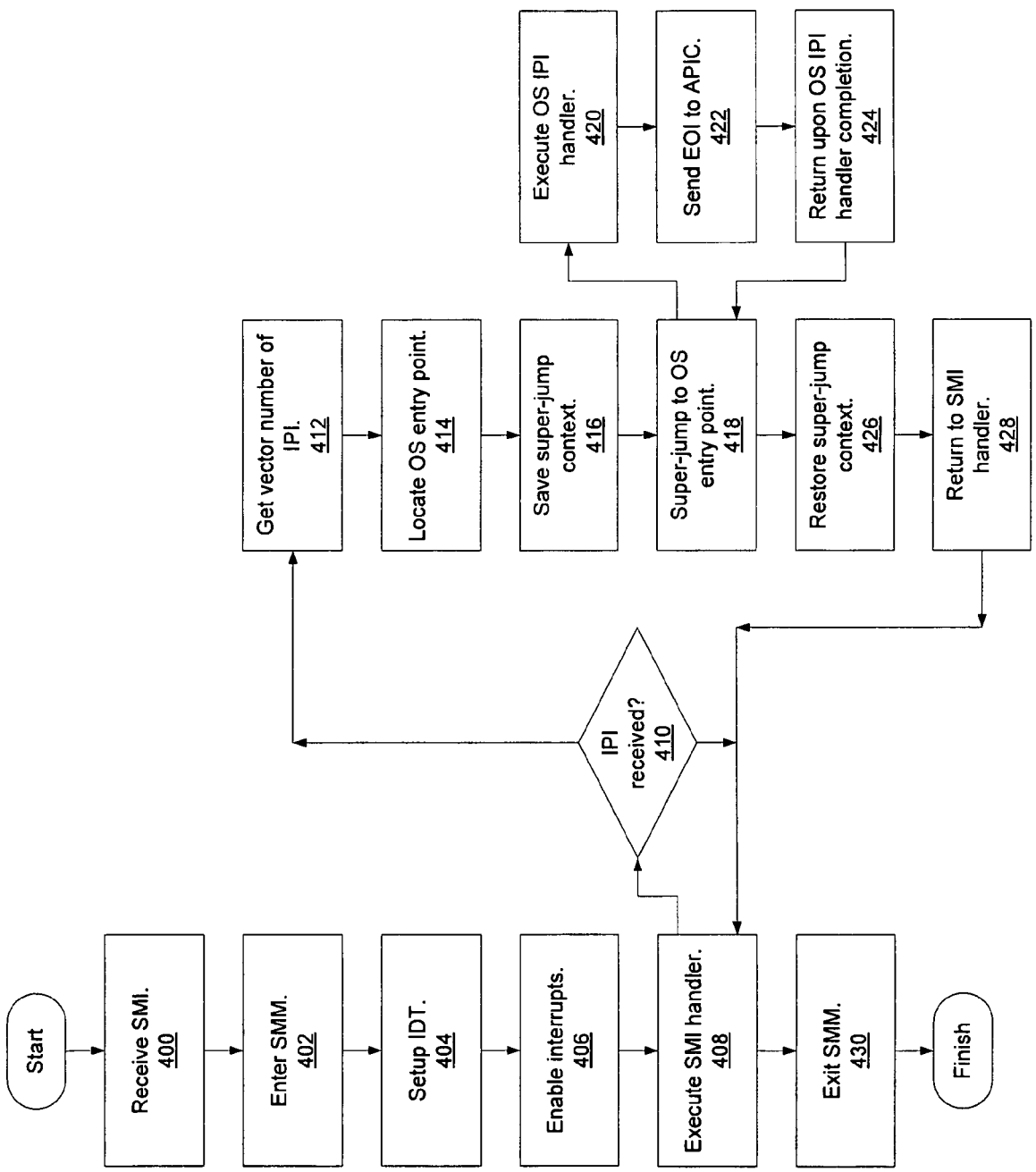
FIG. 4 is a flow diagram of an embodiment of a process to redirect an IPI targeting a processing core in SMM.

FIG. 4 is a flow diagram of an embodiment of a process to redirect an IPI targeting a processing core in SMM. The process may be performed by processing logic that may include hardware circuitry or software (i.e. firmware) or a combination of both. The process starts by the core, for example Core 0 (104 in FIG. 1) receiving an SMI (processing block 400). In different embodiments, the SMI may be either a broadcast SMI or a targeted SMI directed to the core specifically. The core then enters SMM in response to the SMI (processing block 402).

Once the core has entered SMM, processing logic (for example redirection logic 132 in FIG. 1) may set up an interrupt descriptor table (IDT) (134 in FIG. 1) (processing block 404). The IDT is a data structure used to implement an interrupt vector table, which is used by the core to determine the correct response to interrupts and exceptions. The IDT may be constructed in system memory (122 in FIG. 1). The memory address location of the start of the IDT may be stored within the IDTR (112 in FIG. 1). Next, processing logic enables interrupts to the core (processing block 406). This allows the core to receive interrupts in SMM, as opposed to ignoring them, which is what would otherwise happen. In order to not impact the functionality of a device driver, the core in SMM may enable CPU interrupts, but selectively enable and/or disable some device interrupts through a PIC (programmable interrupt controller) or APIC (advanced programmable interrupt controller).

Then processing logic begins executing the SMI handler (processing block 408). The SMI handler may include a specific set of operations depending on the type of work that was requested by the SMI. Because interrupts to the core are enabled, during execution of the SMI processing logic continuously polls as to whether an IPI from another core has been received (processing block 410). If no IPI has been received, processing logic continues to execute the standard SMI handler (processing block 408). Otherwise, if an IPI has been received, then processing logic enters an IPI handling routine by initially getting the vector number of the IPI (processing block 412). The vector number of the IPI may be found in the IDT.

The vector number allows the processing logic to find the proper entry in the IDT. Once the IDT entry to utilize has been found, processing logic can then save a super-jump context (processing block 416). The core can perform a super-jump, which changes the IDT, one or more control registers (CRs-CRx 116 in FIG. 1), and potentially other core-specific information. The super-jump context allows core operational control to be passed from the SMI handler logic, which generally runs outside the scope of any standard OS control, to an OS-run IPI handler. The super-jump allows a temporary OS-executed IPI handler to be given control to complete work related to the IPI. Thus, to allow the core to return to the SMI handler upon completion of the IPI handler, processing logic saves the context (i.e. state) of the core prior to the super-jump. Saving the context may include saving the current IDT, one or more CRs, the instruction pointer (EIP), and additional pieces of information. In many embodiments, the context (136 in FIG. 1) is saved within a system management random access memory (SMRAM) (138 in FIG. 1) portion of system memory. The SMRAM is a portion of the system memory used by a processor to store code related to SMM.

Once the context is saved, processing logic then performs the super-jump to the OS entry point (processing block 418). The super-jump replaces one or more of the pieces of information saved with new information relevant to the super-jump (e.g. a new EIP). Processing logic then begins executing the OS IPI handler (processing block 420). The OS IPI handler runs a set of instructions that allow the core to respond to the IPI by doing the work requested by the IPI. The OS IPI handler (140 in FIG. 1) may run within an operating system stored within system memory. Once the OS IPI handler has completed its work, processing logic then sends an end of interrupt (EOI) command to an Advanced Programmable Interrupt Controller (APIC) in the computer system to notify the APIC that the interrupt work has been completed (processing block 422).

In many embodiments, the instruction utilized to perform the super jump may be a specialized Far Call. A normal Far Call instruction is a call to a procedure located in a different segment than the current code segment. Many registers need to be restored when a context switch is done to have the OS IPI handler execute, such as CR0, CR3, CR4, GDTR, and IDTR. A normal Far Call may only switch the CS (code segment) register and the EIP. Thus, in many embodiments, a bit may be added to a MSR for the processor core to support the full context switch. If the MSR bit is enabled, a Far Call instruction may be parsed as Super Far Call. This will not only switch CS/EIP, but also CRx/GDTR/IDTR/etc. Thus, one instruction may be utilized to enter the OS environment. Upon completion of the OS IPI handler, an OS Iret (Interrupt Return) instruction will be parsed as Super Iret—it will switch the CRx/GDTR/IDTR/etc. and allow the context to return to SMM operation.

After the EOI has been sent to the APIC, processing logic can return the location the core was at prior to jumping to the OS entry point, which takes place because the OS IPI handler has completed (processing block 424). Upon returning to the pre-super-jump location, processing logic restores the super-jump context that was saved prior to the jump (processing logic 426), which may include the IDT, the EIP, one or more CRs, etc. Once the original context is restored, then processing logic allows the core to return to processing the SMI handler in SMM (processing logic 428). The processing of the SMI handler then continues until either another IPI is received, which would repeat the entire super-jump process beginning at block 410, or until the SMI has completed processing, at which point the core then exits SMM (processing logic 430) and the process is complete.

In many embodiments, the operating system is securely measured by a VMM (virtual machine manager) or another secure virtual machine prior to allowing the OS to gain control and run the OS IPI handler. This measuring process may assure a secure environment to hand off control to during the super jump. In many embodiments, an SMI Transfer Monitor (STM) is supported. With STM support, the STM can resume to the OS guest for IPI handling in SMM. The STM can setup a VMCS (Virtual Machine Control Structure) environment to enable a VMExit when an interrupt is received. This can be enabled during initialization. Then if an IPI takes place, the STM will receive a VMExit command due to an interrupt. The STM can then set up a secure environment to launch the OS IPI handler, execute a VMEntry to an IPI handler in SMM. Additionally, the STM can protect the stored context by securing the SMRAM where the context is stored, and protect the SMM execution environment from tampering by the OS IPI handler. This would disallow the SMM execution environment to be compromised by a faulty or malicious OS entity.

Thus, embodiments of a device, system, and method for redirecting Inter-Processor Interrupts while in System Management Mode are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. A method, comprising:
    a plurality of processor cores, residing within a single processor, receiving a first broadcast system management interrupt instructing all cores to enter a system management mode;
    the plurality of processor cores entering into the system management mode in response to receiving the first broadcast system management interrupt;
    the plurality of processor cores receiving a second broadcast system management interrupt instructing all cores that are not busy performing one or more tasks within the system management mode to exit the system management mode; and
    at least a first processor core, comprising one of the plurality of processor cores, exiting the system management mode in response to determining that it is not busy performing one or more tasks within the system management mode.

2. The method of claim 1, further comprising:
    after the first processor core has entered the system management mode,
        saving an interrupt descriptor table to allow processing of interrupts by the first processor core; and
        enabling inter-processor interrupts to the first processor core.

3. The method of claim 2, further comprising:
    after the first processor core has received an inter-processor interrupt,
        saving a current system context for the first processor core into a memory;
        setting up a new super-jump system context for the first processor core to be used upon a super-jump;
        performing a super-jump to an operating system inter-processor interrupt handler location; and
        executing the operating system inter-processor interrupt handler.

4. The method of claim 3, further comprising:
    after the execution of the operating system inter-processor interrupt handler,
        returning to the pre-super-jump location;
        restoring the current system context for the first processor core from the memory; and
        exiting the first processor core from the system management mode.

5. The method of claim 3, further comprising:
    securely measuring an operating system that controls the operating system inter-processor interrupt handler with a system management interrupt transfer monitor prior to allowing the operating system to gain control and execute the handler; and
    upon the measurement, the system management interrupt transfer monitor transferring control to the operating system.

6. The method of claim 3, further comprising:
    setting a bit in a machine specific register of the first processor core in response to the inter-processor interrupt to include one or more first processor core control registers and a first processor core global descriptor table register in a context switch associated with the super-jump.

7. A first core in a processor, to:
    receive a first broadcast system management interrupt instructing all cores within the processor to enter a system management mode;
    enter into the system management mode in response to receiving the first broadcast system management interrupt;
    receive a second broadcast system management interrupt instructing all cores within the processor that are not busy performing one or more tasks within the system management mode to exit the system management mode;

determine that the first core is not busy performing the one or more tasks;

exit system management mode in response to determining that the first core is not busy performing the one or more tasks; and wherein at least one other core in the processor is busy performing the one or more tasks and remains in the system management mode after receiving the second broadcast system management interrupt.

8. The first core of claim 7, further operable to:

after having entered the system management mode,
save an interrupt descriptor table to allow processing of interrupts; and
enable inter-processor interrupts.

9. The first core of claim 8, further operable to:

after having received an inter-processor interrupt,
save a current system context into a memory;
set up a new super-jump system context to be used upon a super-jump;
perform a super-jump to an operating system inter-processor interrupt handler location; and
execute the operating system inter-processor interrupt handler.

10. The first core of claim 9, further operable to:

after having executed the operating system inter-processor interrupt handler,
return to the pre-super-jump location;
restore the current system context from the memory; and
exit from the system management mode.

11. The first processor core of claim 9, further operable to:

securely measure an operating system that controls the operating system inter-processor interrupt handler with a system management interrupt transfer monitor prior to allowing the operating system to gain control and execute the handler; and upon the measurement, the system management interrupt transfer monitor to transfer control to the operating system.

12. The first core of claim 9, further operable to:

set a bit in a machine specific register of the first processor core in response to the inter-processor interrupt to include one or more first processor core control registers and a first processor core global descriptor table register in a context switch associated with the super-jump.

* * * * *

UNITED STATES PATENT AND TRADEMARK OFFICE
CERTIFICATE OF CORRECTION

| | |
|---|---|
| PATENT NO. | : 8,151,027 B2 |
| APPLICATION NO. | : 12/384725 |
| DATED | : April 3, 2012 |
| INVENTOR(S) | : Vincent J. Zimmer et al. |

It is certified that error appears in the above-identified patent and that said Letters Patent is hereby corrected as shown below:

Column 9:
Line 10, "The first core" should be --The first processor core--

Column 9:
Line 15, "The first core" should be --The first processor core--

Column 10:
Line 1, "The first core" should be --The first processor core--

Column 10:
Line 16, "The first core" should be --The first processor core--

Signed and Sealed this
Seventeenth Day of July, 2012

David J. Kappos
*Director of the United States Patent and Trademark Office*